United States Patent
Yang et al.

(10) Patent No.: US 12,256,099 B2
(45) Date of Patent: Mar. 18, 2025

(54) POINT CLOUD SEQUENCE ENCODING/DECODING METHOD AND APPARATUS BASED ON TWO-DIMENSIONAL REGULARIZED PLANE PROJECTION

(71) Applicant: Honor Device Co., Ltd., Shenzhen (CN)

(72) Inventors: Fuzheng Yang, Shenzhen (CN); Wei Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/252,052

(22) PCT Filed: Feb. 7, 2022

(86) PCT No.: PCT/CN2022/075412
§ 371 (c)(1),
(2) Date: May 8, 2023

(87) PCT Pub. No.: WO2022/166969
PCT Pub. Date: Aug. 11, 2022

(65) Prior Publication Data
US 2023/0412841 A1    Dec. 21, 2023

(30) Foreign Application Priority Data
Feb. 8, 2021   (CN) ................. 202110171904.0

(51) Int. Cl.
*H04N 19/597*   (2014.01)
*H04N 19/172*   (2014.01)
*H04N 19/517*   (2014.01)

(52) U.S. Cl.
CPC ........ *H04N 19/597* (2014.11); *H04N 19/172* (2014.11); *H04N 19/517* (2014.11)

(58) Field of Classification Search
CPC .. H04N 19/597; H04N 19/172; H04N 19/517; H04N 19/527; H04N 19/54;
(Continued)

(56) References Cited

U.S. PATENT DOCUMENTS

| 9,332,270 B2 | 5/2016 | Ju et al. |
| 11,388,446 B2 | 7/2022 | Zhang et al. |

(Continued)

FOREIGN PATENT DOCUMENTS

| CN | 1615025 A | 5/2005 |
| CN | 110024404 A | 7/2019 |

(Continued)

OTHER PUBLICATIONS

Xu, Y., "Dynamic Point Cloud Geometry Compression via Patch-wise Polynomial Fitting," ICASSP 2019—2019 IEEE International Conference on Acoustics, Speech and Signal Processing (ICASSP), Brighton, UK, 2019, 5 pages.

*Primary Examiner* — Christopher S Kelley
*Assistant Examiner* — Asmamaw G Tarko
(74) *Attorney, Agent, or Firm* — Conley Rose, P.C.

(57) ABSTRACT

A point cloud sequence encoding/decoding method and apparatus based on two-dimensional regularized plane projection. The encoding method includes: acquiring reference-frame point cloud data and current-frame point cloud data; performing two-dimensional regularized plane projection on the reference-frame point cloud data to obtain a first two-dimensional projection plane structure, and performing two-dimensional regularized plane projection on the current-frame point cloud data to obtain a second two-dimensional projection plane structure; performing motion compensation and encoding on one or more pieces of first two-dimensional graphic information obtained based on the first two-dimensional projection plane structure and one or more pieces of (Continued)

second two-dimensional graphic information obtained based on the second two-dimensional projection plane structure to obtain bit stream information of the current-frame point cloud data; and repeating the foregoing steps until all frames of a point cloud sequence are encoded.

20 Claims, 8 Drawing Sheets

(58) Field of Classification Search
CPC ...... H04N 19/43; H04N 9/3179; G06T 9/001; G06T 9/004
USPC .................................................. 375/240.12
See application file for complete search history.

(56) References Cited

U.S. PATENT DOCUMENTS

| 2017/0347120 | A1* | 11/2017 | Chou | H04N 19/89 |
| 2019/0156520 | A1* | 5/2019 | Mammou | G08B 1/00 |
| 2020/0045342 | A1* | 2/2020 | Bordes | H04N 19/527 |
| 2020/0302632 | A1 | 9/2020 | Oh | |

FOREIGN PATENT DOCUMENTS

| CN | 110708529 B | 8/2020 |
| CN | 110278719 B | 11/2021 |
| WO | 2020251154 A1 | 12/2020 |

\* cited by examiner

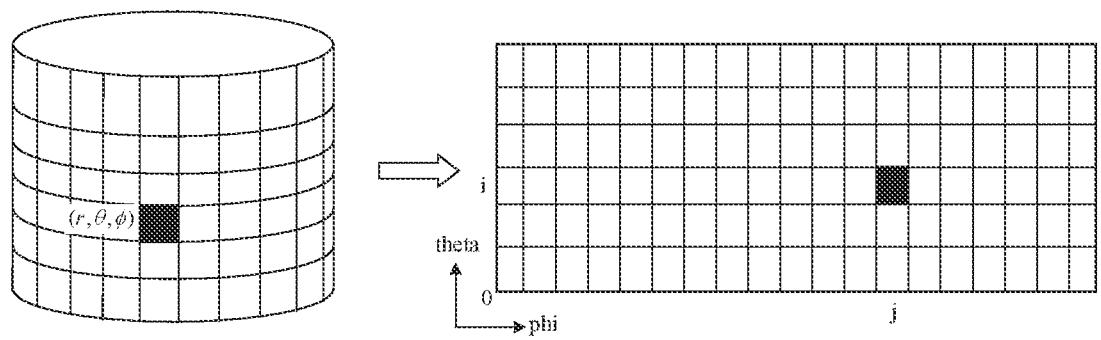
FIG. 3
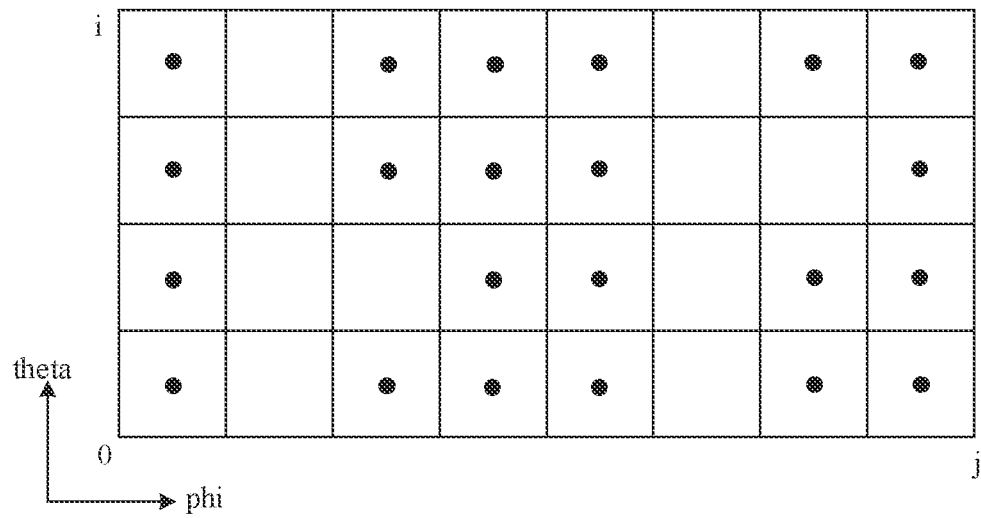
FIG. 4
FIG. 5

POINT CLOUD SEQUENCE ENCODING/DECODING METHOD AND APPARATUS BASED ON TWO-DIMENSIONAL REGULARIZED PLANE PROJECTION

CROSS-REFERENCE TO RELATED APPLICATIONS

This application is a U.S. National Stage of International Application No. PCT/CN2022/075412 filed on Feb. 7, 2022, which claims priority to Chinese Patent Application No. 202110171904.0, filed with the China National Intellectual Property Administration on Feb. 8, 2021, both of which are incorporated herein by reference in their entireties.

TECHNICAL FIELD

The present invention pertains to the field of codec technologies, and specifically, to a point cloud sequence encoding/decoding method and apparatus based on two-dimensional regularized plane projection.

BACKGROUND

With the continuous development of three-dimensional scanning devices, it has been possible to acquire high-precision point clouds. A point cloud sequence can be used to represent moving people, objects, and dynamic scenes, and has been widely used in emerging immersive multimedia such as virtual reality, augmented reality, 3D video conferencing systems, and 3D free-view event playback systems. However, the point cloud sequence has a large amount of data, which challenges data transmission and storage. Therefore, research on an efficient point cloud sequence encoding and decoding technology is of great significance.

At present, representative encoding methods for point cloud sequences include octree-based encoding (G-PCC, Geometry-based Point Cloud Compression) and video-based encoding (V-PCC, Video-based Point Cloud Compression), which are formulated by the moving picture experts group (Moving Picture Experts Group, MPEG).

For octree-based point cloud sequence encoding: input point clouds include a current-frame point cloud and a previous-frame (namely, reference-frame) point cloud. First, global motion compensation is performed on the input reference-frame point cloud data, which specifically is implemented by estimating a global motion vector (MV, Motion Vector) between the reference-frame and current-frame point clouds and performing global motion transformation on the reference frame; then octree division is performed on the reference-frame and current-frame point cloud data; when the octree division reaches a specified depth, if local motion estimation is enabled, the current frame can be used to perform local motion compensation on the reference-frame point cloud and encode the estimated MV information, and otherwise intra prediction is performed on the current frame and whether to directly encode geometric coordinates of points is determined; and finally when the octree division reaches leaf nodes, geometric information of each leaf node is encoded.

For video-based point cloud sequence encoding: during encoding, three-dimensional point cloud information is decomposed into a set of patches, and then these patches are independently mapped to corresponding two-dimensional planes by means of a simple orthogonal projection. In this way, geometric and attribute information of a point cloud is converted into piecewise smooth two-dimensional images, and then these two-dimensional images are padded, combined, and encoded using a traditional video/image codec such as AVC, HEVC, or even JPEG. In addition, extra information obtained from the projection needs to be packaged and encoded to help a decoder to reconstruct a three-dimensional point cloud.

However, a point cloud has a high spatial sparsity. Therefore, for a point cloud sequence encoding technology using an octree structure, empty nodes obtained by division takes up a high proportion, and the spatio-temporal correlation of the point cloud cannot be fully reflected. This affects the spatio-temporal encoding efficiency of the point cloud sequence. Primarily used for encoding dense point cloud sequences, the video-based point cloud sequence coding technology uses cubic projection to directly project a three-dimensional point cloud onto a plurality of two-dimensional planes. This destroys the spatio-temporal correlation of some areas, thereby affecting the encoding efficiency of sparse point cloud sequences.

SUMMARY

To solve the foregoing problem, the present invention provides a point cloud sequence encoding/decoding method and apparatus based on two-dimensional regularized plane projection. In the present invention, the technical problem is solved by using the following technical solution:

A point cloud sequence encoding method based on two-dimensional regularized plane projection, including:

acquiring reference-frame point cloud data and current-frame point cloud data;

performing two-dimensional regularized plane projection on the reference-frame point cloud data to obtain a first two-dimensional projection plane structure; and performing two-dimensional regularized plane projection on the current-frame point cloud data to obtain a second two-dimensional projection plane structure;

performing motion compensation and encoding on one or more pieces of first two-dimensional graphic information obtained based on the first two-dimensional projection plane structure and one or more pieces of second two-dimensional graphic information obtained based on the second two-dimensional projection plane structure to obtain bit stream information of the current-frame point cloud data; and repeating the foregoing steps until all frames of a point cloud sequence are encoded.

In an embodiment of the present invention, before the performing two-dimensional regularized plane projection on the reference-frame point cloud data, the method further includes:

performing global motion compensation on the reference-frame point cloud data based on the current-frame point cloud data.

In an embodiment of the present invention, the first two-dimensional graphic information includes a first geometric information graph; and correspondingly, the second two-dimensional graphic information includes a second geometric information graph.

In an embodiment of the present invention, the first two-dimensional graphic information further includes a first attribute information graph; and correspondingly, the second two-dimensional graphic information further includes a second attribute information graph.

In an embodiment of the present invention, the performing motion compensation and encoding on one or more pieces of first two-dimensional graphic information obtained based on the first two-dimensional projection plane structure and one or more pieces of second two-dimensional graphic information obtained based on the second two-dimensional projection plane structure to obtain bit stream information of the current-frame point cloud data includes:

performing motion estimation on the first two-dimensional graphic information and the second two-dimensional graphic information to obtain a corresponding MV;

performing motion compensation on the corresponding second two-dimensional graphic information based on the MV to obtain a prediction residual; and encoding the prediction residual and the MV information to obtain the bit stream information of the current-frame point cloud data.

In an embodiment of the present invention, the performing motion compensation and encoding on one or more pieces of first two-dimensional graphic information obtained based on the first two-dimensional projection plane structure and one or more pieces of second two-dimensional graphic information obtained based on the second two-dimensional projection plane structure to obtain bit stream information of the current-frame point cloud data further includes:

performing motion estimation on a first geometric information graph in the first two-dimensional graphic information and a second geometric information graph in the second two-dimensional graphic information to obtain a corresponding MV;

performing motion compensation on the corresponding second two-dimensional geometric information graph based on the MV to obtain a geometric prediction residual;

encoding the geometric prediction residual and the MV information to obtain a geometric information bit stream of the current-frame point cloud data;

performing geometric reconstruction based on the geometric information bit stream to obtain reconstructed point cloud geometric information; and encoding attribute information of the current-frame point cloud data based on the reconstructed point cloud geometric information to obtain an attribute information bit stream of the current-frame point cloud data.

In an embodiment of the present invention, the first geometric information graph includes a first placeholder information graph, a first depth information graph, a first projection residual information graph, and a first coordination conversion error information graph; and correspondingly, the second geometric information graph includes a second placeholder information graph, a second depth information graph, a second projection residual information graph, and a second coordination conversion error information graph.

Another embodiment of the present invention further provides a point cloud sequence encoding apparatus based on two-dimensional regularized plane projection. The apparatus includes:

a first data acquisition module, configured to acquire reference-frame point cloud data and current-frame point cloud data;

a first projection module, configured to: perform two-dimensional regularized plane projection on the reference-frame point cloud data to obtain a first two-dimensional projection plane structure; and perform two-dimensional regularized plane projection on the current-frame point cloud data to obtain a second two-dimensional projection plane structure; and a first motion compensation module, configured to perform motion compensation and encoding on one or more pieces of first two-dimensional graphic information obtained based on the first two-dimensional projection plane structure and one or more pieces of second two-dimensional graphic information obtained based on the second two-dimensional projection plane structure to obtain bit stream information of the current-frame point cloud data.

Still another embodiment of the present invention further provides a point cloud sequence decoding method based on two-dimensional regularized plane projection. The method includes:

acquiring bit stream information of reference-frame point cloud data and current-frame point cloud data and decoding the bit stream information of the current-frame point cloud data to obtain parsed data;

performing two-dimensional regularized plane projection on the reference-frame point cloud data to obtain a first two-dimensional projection plane structure;

performing motion compensation based on the parsed data and one or more pieces of first two-dimensional graphic information obtained from the first two-dimensional projection plane structure to obtain one or more pieces of reconstructed second two-dimensional graphic information;

obtaining a second two-dimensional projection plane structure based on the one or more pieces of reconstructed second two-dimensional graphic information;

reconstructing a current-frame point cloud by using the second two-dimensional projection plane structure; and repeating the foregoing steps until all frames of a point cloud sequence are reconstructed.

Still yet another embodiment of the present invention further provides a point cloud sequence decoding apparatus based on two-dimensional regularized plane projection. The apparatus includes:

a second data acquisition module, configured to acquire bit stream information of reference-frame point cloud data and current-frame point cloud data and decode the bit stream information of the current-frame point cloud data to obtain parsed data;

a second projection module, configured to perform two-dimensional regularized plane projection on the reference-frame point cloud data to obtain a first two-dimensional projection plane structure;

a second motion compensation module, configured to perform motion compensation based on the parsed data and one or more pieces of first two-dimensional graphic information obtained from the first two-dimensional projection plane structure to obtain one or more pieces of reconstructed second two-dimensional graphic information;

a reconstruction module, configured to reconstruct a second two-dimensional projection plane structure based on the one or more pieces of reconstructed second two-dimensional graphic information; and a point cloud reconstruction module, configured to reconstruct a current-frame point cloud by using the second two-dimensional projection plane structure.

Beneficial effects of the present invention are as follows:

In the present invention, a point cloud sequence in a three-dimension space is projected into a corresponding two-dimensional regularized projection plane structure, and point clouds are corrected through regularization in a vertical direction and a horizontal direction. This avoids sparsity in a three-dimensional representation structure and highlights spatio-temporal correlation of the point cloud sequence. In this way, the spatio-temporal correlation can be better used for efficient spatio-temporal predictive coding to reduce temporal and spatial redundancy of the point cloud sequence, thereby further improving the point cloud sequence encoding efficiency.

The following further describes the present invention in detail with reference to the accompanying drawings and embodiments.

BRIEF DESCRIPTION OF DRAWINGS

FIG. 3 is a schematic diagram of a mapping between cylindrical coordinates of a point and a pixel in a two-dimensional projection plane according to an embodiment of the present invention;

FIG. 4 is a schematic diagram of a two-dimensional projection plane structure of a point cloud according to an embodiment of the present invention;

FIG. 5 is a schematic diagram of local motion compensation according to an embodiment of the present invention;

DESCRIPTION OF EMBODIMENTS

The following further describes the present invention in detail with reference to specific embodiments, but the embodiments of the present invention are not limited hereto.

Embodiment 1

Figure 1:
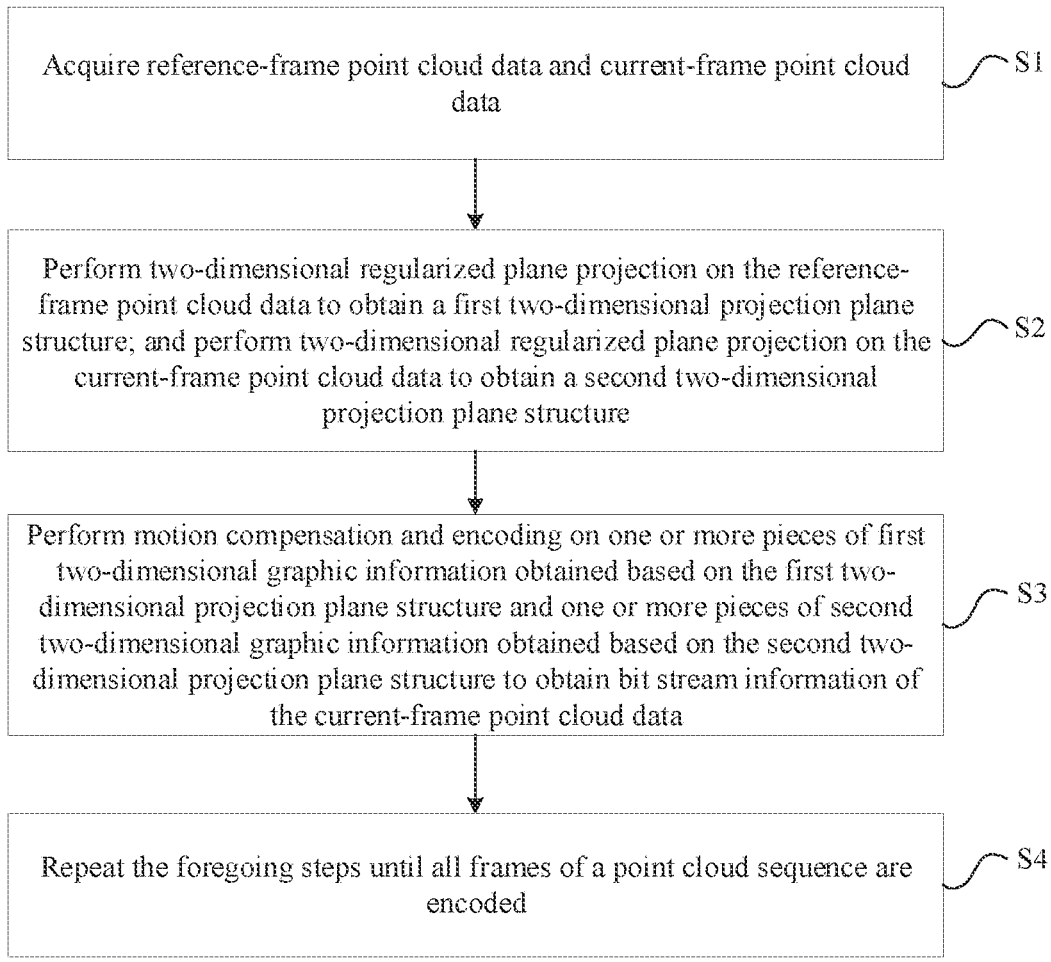
FIG. 1 is a schematic diagram of a point cloud sequence encoding method based on two-dimensional regularized plane projection according to an embodiment of the present invention.

Refer to FIG. 1. FIG. 1 is a schematic diagram of a point cloud sequence encoding method based on two-dimensional regularized plane projection according to an embodiment of the present invention. The method includes the following steps.

S1. Acquire reference-frame point cloud data and current-frame point cloud data.

Generally, the current-frame point cloud is point cloud data to be encoded at the current time. The reference-frame point cloud is point cloud data that has been encoded, decoded, and reconstructed for reference at the current time. It may be one or one or more frames previous to the current-frame point cloud or one or one or more frames following the current-frame point cloud.

In this embodiment, a one-frame point cloud previous to the current-frame point cloud is used as the reference-frame point cloud.

In this embodiment, geometric position information of both the acquired reference-frame point cloud data and the current-frame point cloud data is represented based on the Cartesian coordinate system.

S2. Perform two-dimensional regularized plane projection on the reference-frame point cloud data to obtain a first two-dimensional projection plane structure; and perform two-dimensional regularized plane projection on the current-frame point cloud data to obtain a second two-dimensional projection plane structure.

Figure 2:
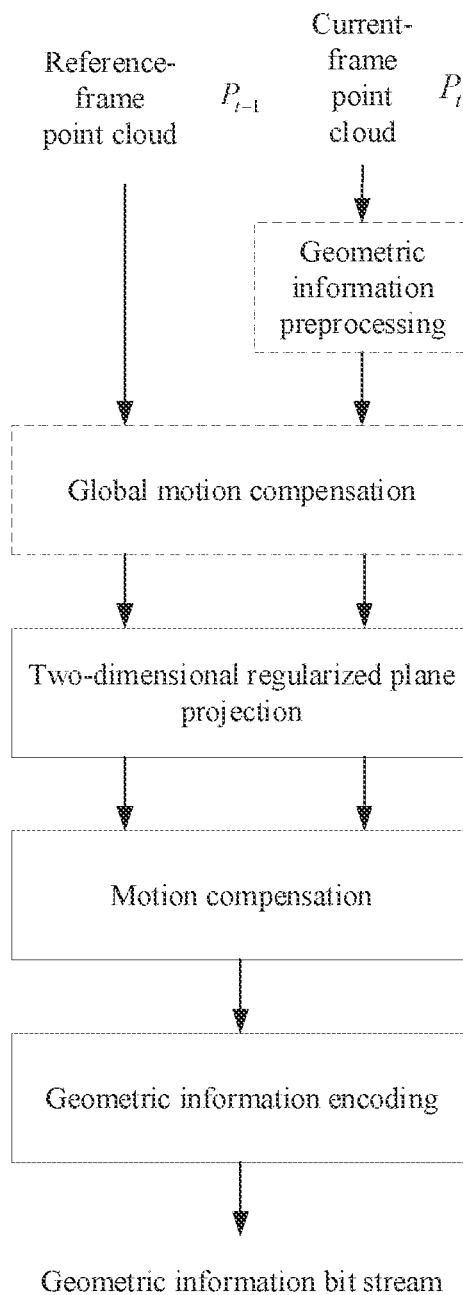
FIG. 2 is a block diagram of encoding geometric information of a point cloud sequence according to an embodiment of the present invention.

Refer to FIG. 2. FIG. 2 is a block diagram of encoding geometric information of a point cloud sequence according to an embodiment of the present invention. In this embodiment, before the performing two-dimensional regularized plane projection on the reference-frame point cloud data, the method further includes: performing global motion compensation on the reference-frame point cloud data based on the current-frame point cloud data.

A three-dimensional scene acquired by the point cloud sequence is dynamic. Therefore, different frames of point cloud data have a motion relationship. Such motion relationship is utilized in global motion compensation to compensate for the reference-frame point cloud and perform motion transformation on the reference-frame point cloud. In this way, correlation between the reference-frame point cloud and the current-frame point cloud can be better utilized.

The following describes in detail a global motion compensation process.

To perform global motion compensation on the reference-frame point cloud, a corresponding point set in the reference-frame point cloud and the current-frame point cloud need to be found and matched first. Accuracy of a search and match algorithm will greatly affect accuracy of global motion estimation. Therefore, it is necessary to find an optimal point pair matching the reference-frame point cloud and the current-frame point cloud. A reasonable method is to search for those point sets that are invariant relative to the world coordinate system, for example, stationary objects such as the ground or trees in the scene. Specifically, the invariant point sets can be found and matched by using an existing method in the octree-based point cloud sequence encoding and decoding technology.

Then, a global MV between the reference-frame point cloud and the current-frame point cloud is estimated based on the corresponding invariant point sets in the reference frame and the current frame. Specifically, the existing least mean square (LMS, Least Mean Square) algorithm can be used to calculate the global MV between the corresponding invariant point sets in the reference frame and the current frame.

Finally, global motion transformation is performed on the reference-frame point cloud based on the estimated global MV to implement global motion compensation of the reference-frame point cloud. Specifically, after the global MV between the reference-frame and current-frame point clouds is obtained through global motion estimation, each point in the reference frame is transformed using the MV information, so as to obtain the reference-frame point cloud on which the global motion compensation has been performed. Assuming that Y is the reference-frame point cloud and Y' is the reference-frame point cloud on which the global motion compensation has been performed, specific transformation is as follows:

$$Y'=MY+V$$

In global MV information, M represents rotation and V represents translation.

Then, two-dimensional regularized plane projection is performed.

Specifically, in this embodiment, before two-dimensional regularized plane projection is performed on the reference-frame point cloud and the current-frame point cloud, pre-processing may also be performed on the current-frame point cloud data, for example, voxelization processing, to facilitate subsequent encoding.

First, the two-dimensional projection plane structure is initialized.

Regularization parameters need to be used in initializing the two-dimensional regularized projection plane structure of a point cloud. Generally, the regularization parameters are finely measured by the manufacturer and provided for consumers as one of necessary data, for example, an acquisition range of a laser radar, sampled angular resolution $\Delta\varphi$ or number of sampled points for horizontal azimuth, as well as a distance correction factor of each laser scanner, information on offsets of a laser scanner along the vertical and horizontal directions $V_0$ and $H_o$, and information on offsets of a laser scanner along the pitch angle and horizontal azimuth angle $\theta_o$ and $\alpha$.

It should be noted that the regularization parameters are not limited to the above-mentioned parameters, which may be given calibration parameters of the laser radar, or may be obtained by such means as estimation optimization and data fitting if the calibration parameters of the laser radar are not given.

The two-dimensional regularized projection plane structure of a point cloud is a data structure containing M rows of and N columns of pixels. After projection, points in a three-dimensional point cloud correspond to pixels in the data structure. In addition, a pixel (i, j) in the data structure can be associated with a cylindrical coordinate component $(\theta, \phi)$. For example, a pixel (i, j) corresponding to cylindrical coordinates $(r, \theta, \phi)$ can be found using the following formula:

$$i = \min_{1,2...LaserNum} |\theta - \theta_0|;$$

$$j = (\phi + 180°)/\Delta\varphi.$$

Specifically, refer to FIG. 3. FIG. 3 is a schematic diagram of a mapping between cylindrical coordinates of a point and a pixel in a two-dimensional projection plane according to an embodiment of the present invention.

It should be noted that such a mapping is not limited to the mapping between pixels and cylindrical coordinates.

Further, resolution of the two-dimensional regularized projection plane may be obtained from the regularization parameters. For example, if the resolution of the two-dimensional regularized projection plane is M×N , the number of laser scanners in the regularization parameters can be used to initialize M, and the sampled angular resolution for horizontal azimuth $\Delta\varphi$ (or the number of sampled points of the laser scanner) is used to initialize N. For example, the following formula can be used to eventually initialize the two-dimensional projection plane structure and obtain a plane structure containing M×N pixels.

$M = laserNum;$ $N = \dfrac{360°}{\Delta\varphi}$ or $N = pointNumPerLaser.$

Second, the mapping between the raw point cloud data and the two-dimensional projection plane structure is determined, so as to project the raw point cloud data onto the two-dimensional projection plane structure.

In this part, a position of the input point cloud in the two-dimensional projection plane structure is determined point by point, so as to map originally discretely distributed point clouds in the Cartesian coordinate system to the uniformly distributed two-dimensional regularized projection plane structure. Specifically, a corresponding pixel is determined in the two-dimensional projection plane structure for each point in the input point cloud. For example, a pixel with the smallest spatial distance from the projected position of a point in the two-dimensional plane can be selected as a corresponding pixel of the point.

If two-dimensional projection is performed in the cylindrical coordinate system, a specific process of determining pixels corresponding to an input point cloud is as follows.

a. For each input point in the input point cloud, use the following formula to calculate the cylindrical coordinate component r of the point:

$r=\sqrt{x^2+y^2}.$ b. Select whether to estimate a search area, for a pixel corresponding to the input point, in the two-dimensional projection plane structure. If estimation is not performed, the entire two-dimensional projection plane structure is searched for the pixel corresponding to the input point; if estimation is performed, the search area for the corresponding pixel in the two-dimensional projection plane structure may be estimated based on cylindrical coordinate components of a pitch angle and an azimuth angle $\phi$ of the input point, or obtained through estimation by other means.

c. After the search area is determined, for each pixel (i, j) therein, calculate a position (xl, yl, zl) of a current pixel in the Cartesian coordinate system by using the regularization parameters, namely, calibration parameters of the i-th laser scanner of the laser radar $\theta_0$, $V_o$, $H_o$, and $\alpha$. The specific calculation formulas are as follows:

$\theta_i = \propto_0$ $\phi_j = -180° + j \times \Delta\varphi$ $xl = r \cdot \sin(\phi_j - \alpha) - H_o \cdot \cos(\phi_j - \alpha)$ $yl = r \cdot \cos(\phi_j - \alpha) + H_o \cdot \sin(\phi_j - \alpha)$ $zl = r \cdot \tan\theta_i + V_o$ d. After the position (xl, yl, zl) of the current pixel in the Cartesian coordinate system is obtained, calculate a spatial distance between the pixel and the input point (x, y, z) and use it as an error Err, namely:

Err=dist{ (x, y, z), (xl, yl, zl)}

If the error Err is smaller than a current minimum error minErr, the error Err is used to update the minimum error minErr, and i and j corresponding to the current pixel are used to update i and j of a pixel corresponding to the input point. If the error Err is greater than the minimum error minErr, the foregoing update process is not performed.

e. When all pixels in the search area are traversed, the corresponding pixel (i, j) of the current point in the two-dimensional projection plane structure can be determined.

When the foregoing operations are completed on all points in the input point cloud, the two-dimensional regularized plane projection of the point cloud is completed. Specifically, refer to FIG. 4. FIG. 4 is a schematic diagram of a two-dimensional projection plane structure of a point cloud according to an embodiment of the present invention, where each input point is mapped to a corresponding pixel in this structure.

It should be noted that during the two-dimensional regularized plane projection of a point cloud, a plurality of points in the point cloud may correspond to a same pixel in the two-dimensional projection plane structure. To avoid this situation, these spatial points can be projected to different pixels during projection. For example, during projection of a specified point, if its corresponding pixel already corresponds to a point, the specified point is projected to an empty pixel adjacent to the pixel. In addition, if a plurality of points in a point cloud have been projected to a same pixel in the two-dimensional projection plane structure, during encoding based on the two-dimensional projection plane structure, the number of corresponding points in each pixel should also be encoded and information on each of the corresponding points in the pixel should be encoded based on the number of corresponding points.

The foregoing description is a process of two-dimensional regularized plane projection of point cloud data. In this embodiment, two-dimensional regularized plane projection needs to be performed on the reference-frame point cloud and the current-frame point cloud according to this process, so as to obtain a two-dimensional projection plane structure corresponding to the reference-frame point cloud, namely the first two-dimensional projection plane structure, and a two-dimensional projection plane structure corresponding to the current-frame point cloud, namely the second two-dimensional projection plane structure. The detailed process is not described herein.

In the present invention, a point cloud sequence in a three-dimension space is projected into a corresponding two-dimensional regularized projection plane structure, and point clouds are corrected through regularization in a vertical direction and a horizontal direction. This avoids sparsity in a three-dimensional representation structure and highlights spatio-temporal correlation of the point cloud sequence.

S3. Perform motion compensation and encoding on one or more pieces of first two-dimensional graphic information obtained based on the first two-dimensional projection plane structure and one or more pieces of second two-dimensional graphic information obtained based on the second two-dimensional projection plane structure to obtain bit stream information of the current-frame point cloud data.

In this embodiment, the first two-dimensional graphic information includes a first geometric information graph, and the second two-dimensional graphic information includes a second geometric information graph. The foregoing geometric information graphs may include but are not limited to a placeholder information graph, a depth information graph, a projection residual information graph, and a coordination conversion error information graph.

The placeholder information graph is used to identify whether a pixel in the two-dimensional regularized projection plane structure is occupied, that is, whether each pixel corresponds to a point in the point cloud. If occupied, the pixel is non-empty; otherwise, the pixel is empty. Therefore, the placeholder information graph can be obtained based on the two-dimensional projection plane structure of the point cloud.

The depth information graph is used to represent distance between the corresponding point of each occupied pixel in the two-dimensional regularized projection plane structure and the coordinate origin. For example, the cylindrical coordinate component r of the corresponding point of the pixel can be used as depth of the pixel. Based on this, each occupied pixel in the two-dimensional regularized projection plane structure has a depth value, and therefore the depth information graph is obtained.

The projection residual information graph is used to represent a residual between a corresponding position and an actual projection position of each occupied pixel in the two-dimensional regularized projection plane structure. Based on this, each occupied pixel in the two-dimensional regularized projection plane structure has a projection residual, and therefore the projection residual information graph is obtained.

The coordinate conversion error information graph is used to represent a residual between a spatial position obtained by back projection of each occupied pixel in the two-dimensional regularized projection plane structure and a spatial position of a raw point corresponding to the pixel. Based on this, each occupied pixel in the two-dimensional regularized projection plane structure has a coordinate conversion error, and therefore a coordinate conversion error information graph corresponding to the point cloud is obtained.

For ease of description, in this embodiment, information related to the reference-frame point cloud is referred to as first information, for example, first two-dimensional graphic information, a first geometric information graph, a first attribute information graph, a first placeholder information graph, a first depth information graph, a first projection residual information graph, and a first coordination conversion error information graph. Information related to the current-frame point cloud is referred to as second information, for example, second two-dimensional graphic information, a second geometric information graph, a second attribute information graph, a second placeholder information graph, a second depth information graph, a second projection residual information graph, and a second coordination conversion error information graph.

In this embodiment, the motion compensation based on the first two-dimensional graphic information and the second two-dimensional graphic information may be global motion compensation, local motion compensation, or global and local motion compensation.

The following describes in detail the compensation and encoding process of local motion compensation on a specific geometric information graph.

Local motion compensation may be performed on the current-frame point cloud based on the reference-frame point cloud or performed on the reference-frame point cloud based on the current-frame point cloud. In this embodiment, compensation being performed on the current-frame point cloud based on the reference-frame point cloud is used as an example for detailed description.

In this embodiment, step S3 specifically includes the following.

31) Perform motion estimation on the first two-dimensional graphic information and the second two-dimensional graphic information to obtain a corresponding MV A size of a local pixel block is set, and each pixel block in the second geometric information graph is traversed according to a specified scanning order.

Then local motion estimation is performed to search for an optimal matching block in the first geometric information graph for the current pixel block in the second geometric information graph, and displacement between the two matching blocks is calculated to obtain a local MV Specifically, an existing full search algorithm or fast search algorithm (such as the TZSearch algorithm in H.266/VVC) can be used to search for candidate matching blocks in the first geometric information graph, and then the candidate matching block with the minimum rate-distortion cost is selected as the matching block of the current pixel block. In rate-distortion optimization, geometric information difference between the current pixel block and the candidate matching block can be used as distortion, and the displacement between the current pixel block and the candidate matching block is compressed as the code rate. The displacement between the two matching blocks is the local MV of the current pixel block. Refer to FIG. 5. FIG. 5 is a schematic diagram of local motion compensation according to an embodiment of the present invention. On the right side is the second geometric information graph, and the current pixel block is in the dashed-line box. On the left side is the first geometric information graph, and the displacement indicated by an arrow is the local MV of the current pixel block.

32) Perform motion compensation on the corresponding second two-dimensional graphic information based on the MV to obtain a prediction residual.

Specifically, local MV information is used to find a matching block in the first geometric information graph for the current pixel block in the second geometric information graph; and then, reconstructed geometric information in the matching block is used to predict geometric information in the current pixel block, so as to obtain a geometric information prediction residual of the current pixel block.

In this embodiment, apart from a pixel block, some pixel sets in an image may also be used to implement local motion compensation.

33) Encode the prediction residual and the MV information to obtain the bit stream information of the current-frame point cloud data.

In the encoding process, the local MV information and the prediction residual information of each pixel block need to be encoded.

Specifically, the local MV information of each pixel block can be predicted using an existing prediction technology and encoded using an existing entropy coding technology. The prediction residual of each pixel block can be predicted using an existing prediction technology and encoded using an existing entropy coding technology. Also, two-dimensional graphic information generated by the prediction residual can be compressed using n image/video coding scheme such as JPEG, JPEG2000, HEIF, H.264\AVC, or H.265\HEVC.

For other geometric information graphs, the local MV obtained above is directly used for local motion compensation to obtain a prediction residual and encoding is performed; alternatively, with reference to the foregoing local motion compensation process, local MVs are estimated sequentially and local motion compensation is performed, and the obtained local MVs and prediction residual are encoded.

It should be noted that if global motion compensation has been performed on the reference-frame point cloud data based on the current-frame point cloud data before two-dimensional regularized plane projection, global MV information also needs to be encoded.

Now, the geometric information bit stream of the current-frame point cloud data is obtained.

S4. Repeat the foregoing steps until all frames of a point cloud sequence are encoded.

Specifically, only the current-frame point cloud data is encoded after the foregoing steps. Therefore, the foregoing steps need to be repeated until all frames of the point cloud sequence are encoded.

Now, geometric information of all frames of the point cloud sequence are encoded.

In the present invention, a point cloud sequence in a three-dimension space is projected into a corresponding two-dimensional regularized projection plane structure, and point clouds are corrected through regularization in a vertical direction and a horizontal direction. This avoids sparsity in a three-dimensional representation structure and highlights spatio-temporal correlation of the point cloud sequence. In this way, the spatio-temporal correlation can be better used for efficient spatio- temporal predictive coding to reduce temporal and spatial redundancy of the point cloud sequence, thereby further improving the point cloud sequence encoding efficiency.

Embodiment 2

Figure 6:
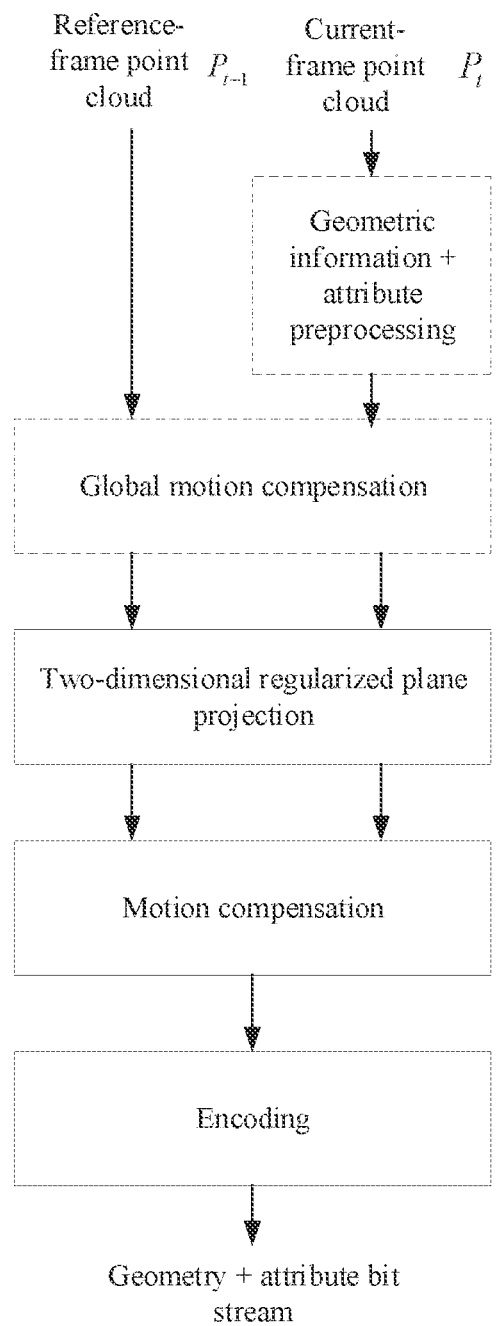
FIG. 6 is a block diagram of encoding both geometric information and attribute information of a point cloud sequence according to an embodiment of the present invention.

On the basis of embodiment 1, geometric information and attribute information can be encoded together. Specifically, refer to FIG. 6. FIG. 6 is a block diagram of encoding both geometric information and attribute information of a point cloud sequence according to an embodiment of the present invention.

The first two-dimensional graphic information obtained based on the first two-dimensional projection plane structure further includes a first attribute information graph; and correspondingly, the second two-dimensional graphic information obtained based on the second two-dimensional projection plane structure further includes a second attribute information graph.

Specifically, with reference to the motion compensation method in embodiment 1, motion compensation and encoding are performed on the second attribute information graph to obtain an attribute information bit stream of the current-frame point cloud data.

Embodiment 3

Figure 7:
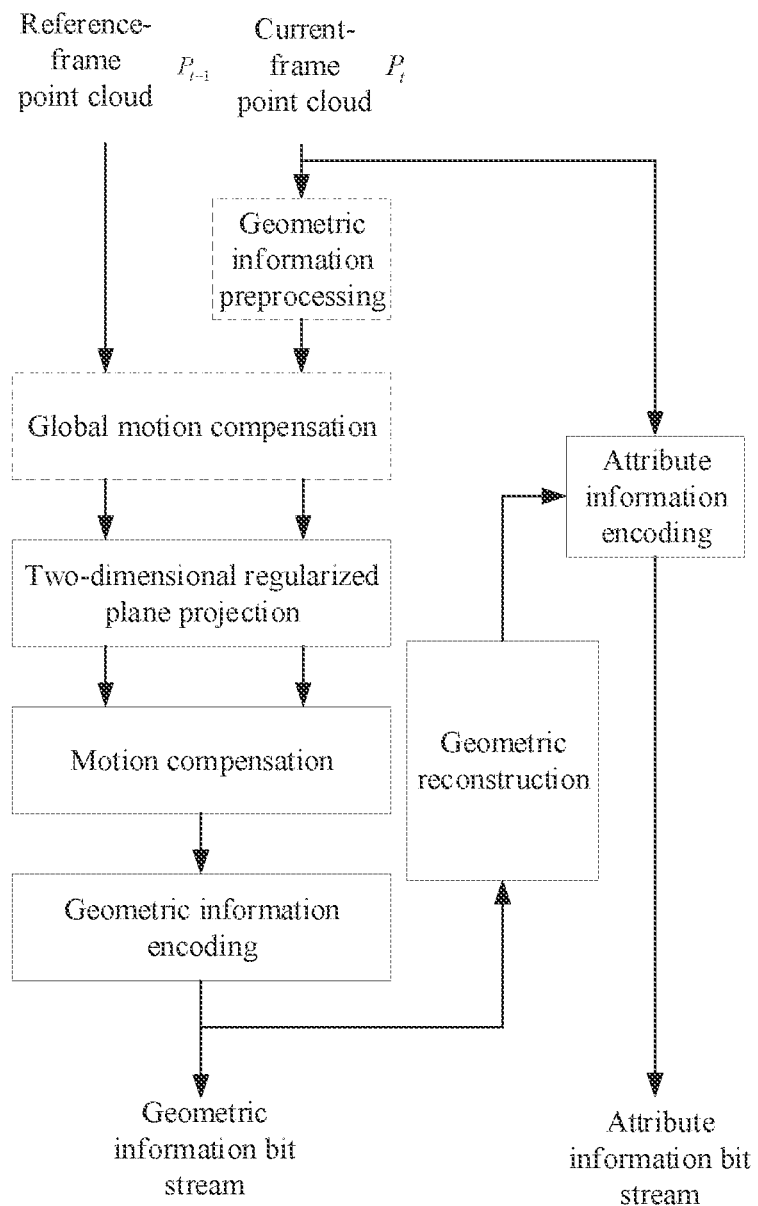
FIG. 7 is a block diagram of encoding attribute information based on reconstructed geometric information according to an embodiment of the present invention.

In this embodiment, attribute information is encoded based on reconstructed geometric information during encoding of current-frame point cloud data. Refer to FIG. 7. FIG. 7 is a block diagram of encoding attribute information based on reconstructed geometric information according to an embodiment of the present invention.

On the basis of embodiment 1, step S3 may further include the following.

3a) Perform motion estimation on a first geometric information graph in the first two-dimensional graphic information and a second geometric information graph in the second two-dimensional graphic information to obtain a corresponding MV.

3b) Perform motion compensation on the corresponding second two-dimensional geometric information graph based on the MV to obtain a geometric prediction residual;

3c) Encode the geometric prediction residual and the MV information to obtain a geometric information bit stream of the current-frame point cloud data.

Specifically, in this embodiment, for specific implementations of steps 3a) to 3c), refer to embodiment 1.

3d) Perform geometric reconstruction based on the geometric information bit stream to obtain reconstructed point cloud geometric information.

3e) Encode attribute information of the current-frame point cloud data based on the reconstructed point cloud geometric information to obtain an attribute information bit stream of the current-frame point cloud data.

Attribute information encoding is generally performed on color and reflectance information of spatial points. An existing technology can be used to encode attribute information of the current-frame point cloud data based on the geometric reconstruction information of the current-frame point cloud data. For example, the color information in attributes is transformed from RGB color space to YUV color space. Then, the reconstructed geometric information is used to recolor the point cloud so that uncoded attribute information corresponds to the reconstructed geometric information. After point cloud sorting is performed using Morton code or Hilbert code, a reconstructed attribute value of a coded point is used to interpolate and predict a to-be-predicted point to obtain a predicted attribute value. Then, difference is performed on a true attribute value and the predicted attribute value to obtain a prediction residual. Finally, the prediction residual is quantized and encoded to generate a binary bit stream.

Embodiment 4

Figure 8:
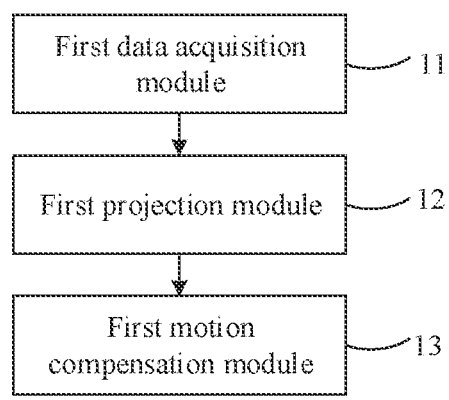
FIG. 8 is a schematic structural diagram of a point cloud sequence encoding apparatus based on two-dimensional regularized plane projection according to an embodiment of the present invention.

On the basis of embodiments 1 to 3, this embodiment provides a point cloud sequence encoding apparatus based on two-dimensional regularized plane projection. Refer to FIG. 8. FIG. 8 is a schematic structural diagram of a point cloud sequence encoding apparatus based on two-dimensional regularized plane projection according to an embodiment of the present invention. The apparatus includes:

a first data acquisition module 11, configured to acquire reference-frame point cloud data and current-frame point cloud data;

a first projection module 12, configured to: perform two-dimensional regularized plane projection on the reference-frame point cloud data to obtain a first two-dimensional projection plane structure; and perform two-dimensional regularized plane projection on the current-frame point cloud data to obtain a second two-dimensional projection plane structure; and a first motion compensation module 13, configured to perform motion compensation and encoding on one or more pieces of first two-dimensional graphic information obtained based on the first two-dimensional projection plane structure and one or more pieces of second two-dimensional graphic information obtained based on the second two-dimensional projection plane structure to obtain bit stream information of the current-frame point cloud data.

The encoding apparatus provided in this embodiment can implement the encoding method described in embodiments 1 to 3. The detailed process is not described herein again.

Embodiment 5

Figure 9:
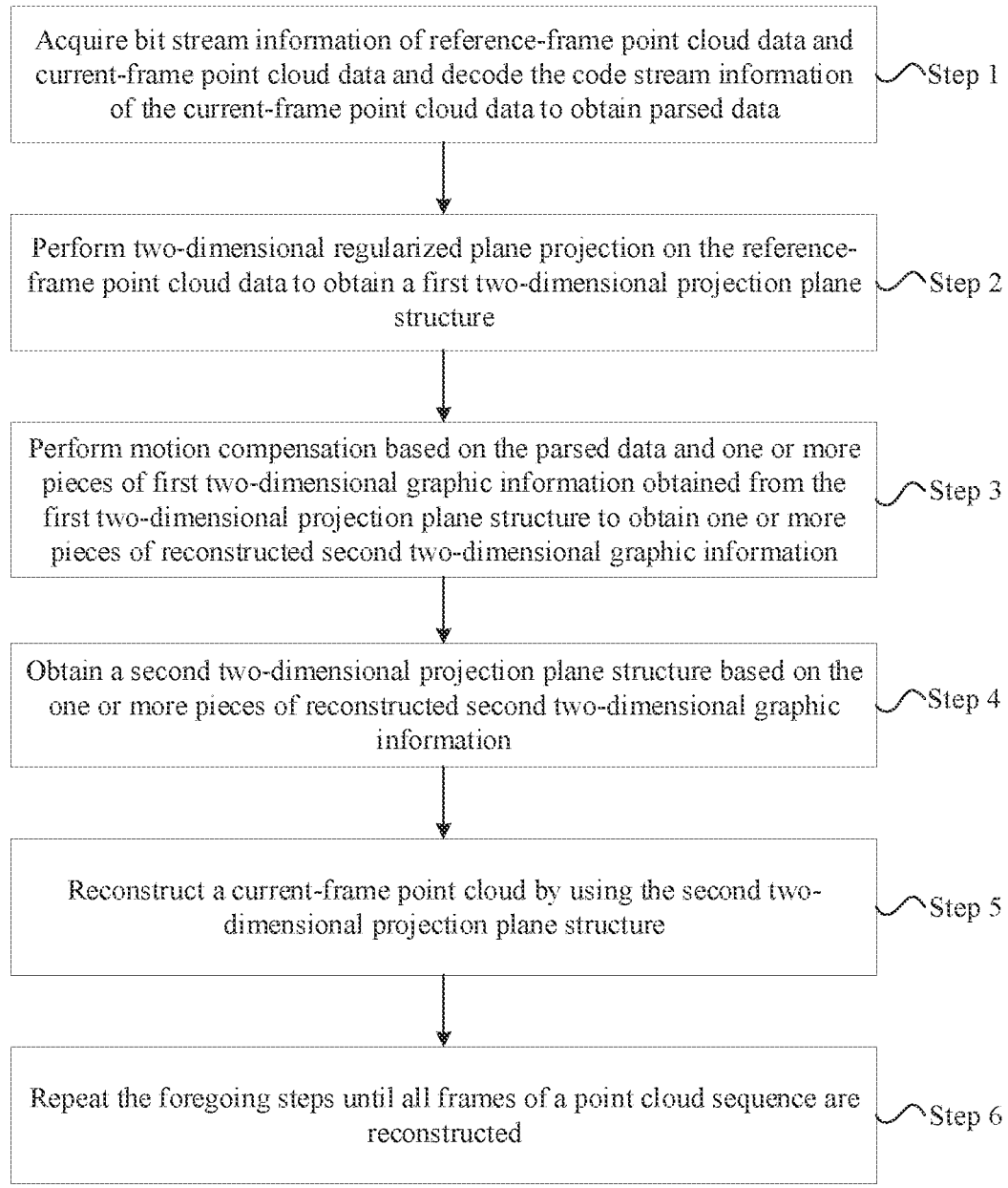
FIG. 9 is a schematic diagram of a point cloud sequence decoding method based on two-dimensional regularized plane projection according to an embodiment of the present invention.

Refer to FIG. 9. FIG. 9 is a schematic diagram of a point cloud sequence decoding method based on two-dimensional regularized plane projection according to an embodiment of the present invention. The method includes the following steps.

Step 1. Acquire bit stream information of reference-frame point cloud data and current-frame point cloud data and decode the bit stream information of the current-frame point cloud data to obtain parsed data.

A decoding end acquires the reference-frame point cloud data used by an encoding end, acquires compressed bit stream information, and then uses a corresponding prediction and entropy decoding technology to decode the bit stream information accordingly to obtain the parsed data.

Step 2. Perform two-dimensional regularized plane projection on the reference-frame point cloud data to obtain a first two-dimensional projection plane structure.

In this embodiment, if global motion compensation has been performed at the encoding end, before the performing two-dimensional regularized plane projection on the reference-frame point cloud data, the method further includes: performing global motion compensation on the reference-frame point cloud data based on a global MV obtained by parsing, so as to obtain a reference-frame point cloud on which global motion compensation has been performed. The specific compensation method is described in S2 of embodiment 1.

Then, two-dimensional regularized plane projection is performed on the reference-frame point cloud.

Specifically, according to the process of performing two-dimensional regularized plane projection on a point cloud, which is described in S2 of embodiment 1, two-dimensional regularized plane projection is performed on the reference-frame point cloud data to obtain a two-dimensional projection plane structure corresponding to the reference-frame point cloud, namely the first two-dimensional projection plane structure.

Step 3. Perform motion compensation based on the parsed data and one or more pieces of first two-dimensional graphic information obtained from the first two-dimensional projection plane structure to obtain one or more pieces of reconstructed second two-dimensional graphic information.

In this embodiment, both the first two-dimensional graphic information and the second two-dimensional graphic information are geometric information graphs, including but not limited to a placeholder information graph, a depth information graph, a projection residual information graph, and a coordination conversion error information graph.

Motion compensation includes global motion compensation and local motion compensation. As at the encoding end, local motion compensation being performed on one geometric information graph is used as an example for description in this embodiment. Based on this, parsed data primarily includes a prediction residual, local MV information, and the like of geometric information.

At the encoding end, the size of a local pixel block is set, pixel blocks in the second geometric information graph are traversed according to a specified scanning order, and corresponding information is encoded. Therefore, the prediction residual information and global MV information of the pixel blocks obtained by the decoding end also follow this order, and the decoding end can obtain resolution of the second geometric information graph by using regularization parameters. For details, refer to S2 of embodiment 1, in which the two-dimensional projection plane structure is initialized. As a result, the decoding end can acquire a position of a current to-be-reconstructed pixel block in the second geometric information graph.

For the current to-be-reconstructed pixel block in the second geometric information graph, local motion compensation can be performed by using the local MV information obtained by parsing. To be specific, the local MV information obtained by parsing is used to find a corresponding matching block in the first geometric information graph, reconstructed geometric information in the matching block is used to predict geometric information in the current to-be-reconstructed pixel block, and finally geometric information of the current pixel block is reconstructed based on a predicted value obtained and a prediction residual obtained by parsing.

After each pixel block in the second geometric information graph has been reconstructed, a reconstructed second geometric information graph is obtained.

For other geometric information graphs, the local MV obtained by parsing is directly used for local motion compensation and geometric information is reconstructed based on a prediction residual; or local motion compensation is performed based on a local MV parsed by these graphs, and geometric information is reconstructed based on a prediction residual.

Step 4. Obtain a second two-dimensional projection plane structure based on the one or more pieces of reconstructed second two-dimensional graphic information.

Resolution of the second two-dimensional projection plane structure is consistent with resolution of the second two-dimensional graphic information, and the second two-dimensional graphic information has been reconstructed. Therefore, geometric information of each pixel in the second two-dimensional projection plane structure can be obtained, so that a reconstructed second two-dimensional projection plane structure can be obtained.

Correspondingly, the reconstructed second two-dimensional projection plane structure may further include attribute information of the point cloud.

Step 5. Reconstruct a current-frame point cloud by using the second two-dimensional projection plane structure.

Specifically, pixels in the reconstructed second two-dimensional projection plane structure are traversed according to a specified scanning order, so that the geometric information of each pixel can be obtained, including but not limited to placeholder information, depth information, projection residual information, and coordinate conversion error information. If placeholder information of a current pixel (i, j) is not empty, the following method can be used to reconstruct a spatial point (x, y, z) corresponding to the pixel based on depth information (namely, a cylindrical coordinate component r of the point corresponding to the pixel), projection residual information (namely, residual ($\Delta\phi$, $\Delta i$) between a corresponding position and an actual projection position of the pixel), and coordination conversion error information (namely, residual ($\Delta x$, $\Delta y$, $\Delta z$) between a spatial position obtained by back projection of the pixel and a spatial position of a raw point corresponding to the pixel) of the current pixel.

The corresponding position of the current pixel (i, j) can be represented as ($\phi_j$, i). Then, the actual projection position ($\phi'$, i') of the spatial point corresponding to the current pixel is as follows:

$$\phi_j = -180° + j \times \Delta\phi$$

$$\phi' = \phi_j + \Delta\phi$$

$$i' = i + \Delta i$$

Regularization parameters and the following formula can be used to project the current pixel back to the Cartesian coordinate system, so as to obtain the corresponding Cartesian coordinates (xl, yl, zl).

$$\theta_i = \propto_0$$

$$\phi_j = -180° + j \times \Delta\phi$$

$$xl = r \cdot \sin(\phi_j - \alpha) - H_o \cdot \cos(\phi_j - \alpha)$$

$$yl = r \cdot \cos(\phi_j - \alpha) + H_o \cdot \sin(\phi_j - \alpha)$$

$$zl = r \cdot \tan\theta_i + V_o$$

According to the following formula, the spatial point (x, y, z) corresponding to the current pixel is reconstructed based on the spatial position (xl, yl, zl) obtained by back projection of the current pixel and the coordinate conversion error ($\Delta x$, $\Delta y$, $\Delta z$).

$$x = xl + \Delta x$$

$$y = yl + \Delta y$$

$$z = zl + \Delta z$$

A corresponding spatial point can be reconstructed based on the foregoing calculations for each non-empty pixel in the second two-dimensional projection structure, so as to obtain a reconstructed current-frame point cloud.

It should be noted that during reconstruction of the current-frame point cloud at the decoding end, a reconstruction manner can be adaptively selected based on how the geometric information and attribute information of the current-frame point cloud is encoded at the encoding end, so as to obtain the reconstructed current-frame point cloud.

Step 6. Repeat the foregoing steps until all frames of a point cloud sequence are reconstructed.

Specifically, only the current-frame point cloud data is decoded after the foregoing steps. Therefore, the foregoing steps need to be repeated until all frames of the point cloud sequence are decoded.

Embodiment 6

Figure 10:
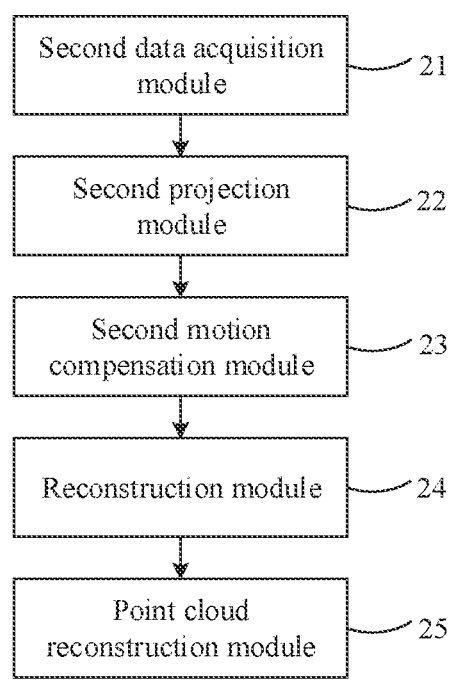
FIG. 10 is a schematic structural diagram of a point cloud sequence decoding apparatus based on two-dimensional regularized plane projection according to an embodiment of the present invention.

On the basis of embodiment 5, this embodiment provides a point cloud sequence decoding apparatus based on two-dimensional regularized plane projection. Refer to FIG. 10. FIG. 10 is a schematic structural diagram of a point cloud sequence decoding apparatus based on two-dimensional regularized plane projection according to an embodiment of the present invention. The apparatus includes:

a second data acquisition module 21, configured to acquire bit stream information of reference-frame point cloud data and current-frame point cloud data and decode the bit stream information of the current-frame point cloud data to obtain parsed data;

a second projection module 22, configured to perform two-dimensional regularized plane projection on the reference-frame point cloud data to obtain a first two-dimensional projection plane structure;

a second motion compensation module 23, configured to perform motion compensation based on the parsed data and one or more pieces of first two-dimensional graphic information obtained from the first two-dimensional projection plane structure to obtain one or more pieces of reconstructed second two-dimensional graphic information;

a reconstruction module 24, configured to reconstruct a second two-dimensional projection plane structure based on the one or more pieces of reconstructed second two-dimensional graphic information; and a point cloud reconstruction module 25, configured to reconstruct a current-frame point cloud by using the second two-dimensional projection plane structure.

The decoding apparatus provided in this embodiment can implement the decoding method described in embodiment 5. The detailed process is not described herein again.

The foregoing descriptions are further detailed descriptions of the present invention with reference to specific preferred embodiments, and it cannot be construed that the specific implementation of the present invention is merely limited to these descriptions. For those of ordinary skill in the technical field of the present invention, without departing from the concept of the present invention, some simple deductions or replacements can be further made and should fall within the protection scope of the present invention.

What is claimed is:

1. A method, comprising:
  acquiring reference-frame point cloud data and current-frame point cloud data;
  performing two-dimensional regularized plane projection on the reference-frame point cloud data to obtain a first two-dimensional projection plane structure;
  performing two-dimensional regularized plane projection on the current-frame point cloud data to obtain a second two-dimensional projection plane structure;
  performing motion compensation and encoding on one or more pieces of first two-dimensional graphic information obtained based on the first two-dimensional projection plane structure and one or more pieces of second two-dimensional graphic information obtained based on the second two-dimensional projection plane structure to obtain bit stream information of the current-frame point cloud data, wherein the first two-dimensional graphic information comprises a first geometric information graph and the second two-dimensional graphic information comprises a second geometric information graph; and
  repeating the foregoing steps to encode a plurality of frames of a point cloud sequence.

2. The method of claim 1, wherein before performing two-dimensional regularized plane projection on the reference-frame point cloud data, the method further comprises performing global motion compensation on the reference-frame point cloud data based on the current-frame point cloud data.

3. The method of claim 1, wherein the first two-dimensional graphic information further comprises a first attribute information graph and the second two-dimensional graphic information further comprises a second attribute information graph.

4. The method of claim 1, wherein performing motion compensation and encoding on the first two-dimensional graphic information the second two-dimensional graphic information to obtain bit stream information of the current-frame point cloud data comprises:
  performing motion estimation on the first two-dimensional graphic information and the second two-dimensional graphic information to obtain a corresponding motion vector (MV);
  performing motion compensation on the second two-dimensional graphic information based on the MV to obtain a prediction residual; and
  encoding the prediction residual and MV information to obtain the bit stream information of the current-frame point cloud data.

5. The method of claim 1, wherein performing motion compensation and encoding on the first two-dimensional graphic information and the second two-dimensional graphic information to obtain bit stream information of the current-frame point cloud data further comprises:
  performing motion estimation on the first geometric information graph in the first two-dimensional graphic information and the second geometric information graph in the second two-dimensional graphic information to obtain a corresponding motion vector (MV);
  performing motion compensation on the corresponding second two-dimensional geometric information graph based on the MV to obtain a geometric prediction residual;
  encoding the geometric prediction residual and MV information to obtain a geometric information bit stream of the current-frame point cloud data;
  performing geometric reconstruction based on the geometric information bit stream to obtain reconstructed point cloud geometric information; and
  encoding attribute information of the current-frame point cloud data based on the reconstructed point cloud geometric information to obtain an attribute information bit stream of the current-frame point cloud data.

6. The method of claim 1, wherein the first geometric information graph comprises a first placeholder information graph, a first depth information graph, a first projection residual information graph, and a first coordination conversion error information graph, and wherein the second geometric information graph comprises a second placeholder information graph, a second depth information graph, a second projection residual information graph, and a second coordination conversion error information graph.

7. The method of claim 1, wherein the motion compensation is at least one of global motion compensation or local motion compensation.

8. A method, comprising:
  acquiring bit stream information of reference-frame point cloud data and current-frame point cloud data and decoding the bit stream information of the current-frame point cloud data to obtain parsed data;
  performing two-dimensional regularized plane projection on the reference-frame point cloud data to obtain a first two-dimensional projection plane structure;
  performing motion compensation based on the parsed data and one or more pieces of first two-dimensional graphic information obtained from the first two-dimensional projection plane structure to obtain one or more pieces of reconstructed second two-dimensional graphic information, wherein the first two-dimensional graphic information or the second two-dimensional graphic information is a geometric information graph;
  obtaining a second two-dimensional projection plane structure based on the one or more pieces of reconstructed second two-dimensional graphic information;
  reconstructing a current-frame point cloud by using the second two-dimensional projection plane structure; and
  repeating the foregoing steps to decode a plurality of frames of a point cloud sequence.

9. The method of claim 8, wherein decoding the bit stream information of the current-frame point cloud data comprises using prediction and entropy decoding to decode the bit stream information.

10. The method of claim 8, wherein before performing two-dimensional regularized plane projection on the reference-frame point cloud data, the method further comprises performing global motion compensation on the reference-frame point cloud data based on a global motion vector (MV) obtained by parsing, so as to obtain a reference-frame point cloud on which global motion compensation has been performed.

11. The method of claim 8, wherein the geometric information graph is at least one of a placeholder information graph, a depth information graph, a projection residual information graph, and a coordination conversion error information graph.

12. The method of claim 8, wherein the motion compensation is at least one of global motion compensation or local motion compensation.

13. The method of claim 8, wherein the second two-dimensional projection plane structure comprises attribute information of the point cloud.

14. The method of claim 8, wherein the geometric information graph comprises a placeholder information graph, a depth information graph, a projection residual information graph, and a coordination conversion error information graph.

15. An apparatus, comprising:
one or more processors; and
one or more memories coupled to the one or more processors and storing instructions that, when executed by the one or more processors, cause the apparatus to be configured to:
acquire reference-frame point cloud data and current-frame point cloud data;
perform two-dimensional regularized plane projection on the reference-frame point cloud data to obtain a first two-dimensional projection plane structure;
perform two-dimensional regularized plane projection on the current-frame point cloud data to obtain a second two-dimensional projection plane structure;
perform motion compensation and encoding on one or more pieces of first two-dimensional graphic information obtained based on the first two-dimensional projection plane structure and one or more pieces of second two-dimensional graphic information obtained based on the second two-dimensional projection plane structure to obtain bit stream information of the current-frame point cloud data, wherein the first two-dimensional graphic information comprises a first geometric information graph and the second two-dimensional graphic information comprises a second geometric information graph; and
repeat the foregoing steps to encode a plurality of frames of a point cloud sequence.

16. The apparatus of claim 15, wherein before performing two-dimensional regularized plane projection on the reference-frame point cloud data, the instructions, when executed by the one or more processors, further cause the apparatus to be configured to perform global motion compensation on the reference-frame point cloud data based on the current-frame point cloud data.

17. The apparatus of claim 15, wherein the first two-dimensional graphic information further comprises a first attribute information graph and the second two-dimensional graphic information further comprises a second attribute information graph.

18. The apparatus of claim 15, wherein performing motion compensation and encoding on the first two-dimensional graphic information and the second two-dimensional graphic information to obtain bit stream information of the current-frame point cloud data comprises the apparatus being configured to:
perform motion estimation on the first two-dimensional graphic information and the second two-dimensional graphic information to obtain a corresponding motion vector (MV);
perform motion compensation on the second two-dimensional graphic information based on the MV to obtain a prediction residual; and
encode the prediction residual and MV information to obtain the bit stream information of the current-frame point cloud data.

19. The apparatus of claim 15, wherein performing motion compensation and encoding on the first two-dimensional graphic information and the second two-dimensional graphic information to obtain bit stream information of the current-frame point cloud data further comprises the apparatus being configured to:
perform motion estimation on the first geometric information graph in the first two-dimensional graphic information and the second geometric information graph in the second two-dimensional graphic information to obtain a corresponding motion vector (MV);
perform motion compensation on the corresponding second two-dimensional geometric information graph based on the MV to obtain a geometric prediction residual;
encode the geometric prediction residual and MV information to obtain a geometric information bit stream of the current-frame point cloud data;
perform geometric reconstruction based on the geometric information bit stream to obtain reconstructed point cloud geometric information; and
encode attribute information of the current-frame point cloud data based on the reconstructed point cloud geometric information to obtain an attribute information bit stream of the current-frame point cloud data.

20. The apparatus of claim 15, wherein the first geometric information graph comprises a first placeholder information graph, a first depth information graph, a first projection residual information graph, and a first coordination conversion error information graph, and wherein the second geometric information graph comprises a second placeholder information graph, a second depth information graph, a second projection residual information graph, and a second coordination conversion error information graph.

\* \* \* \* \*